United States Patent
Veit et al.

(10) Patent No.: US 6,615,972 B2
(45) Date of Patent: Sep. 9, 2003

(54) SORTATION SYSTEM DIVERTER SWITCH

(75) Inventors: Frank W. Veit, Spring Lake, MI (US); Charles W. Bozarth, Comstock Park, MI (US); Robert W. Houskamp, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/840,639

(22) Filed: Apr. 23, 2001

(65) Prior Publication Data

US 2002/0033318 A1 Mar. 21, 2002

Related U.S. Application Data

(60) Provisional application No. 60/200,183, filed on Apr. 27, 2000, and provisional application No. 60/235,108, filed on Sep. 25, 2000.

(51) Int. Cl.[7] ................................................ B65G 47/46
(52) U.S. Cl. ............................ 198/370.02; 198/370.13
(58) Field of Search ............................... 198/350, 364, 198/370.02, 370.03, 370.07, 370.13, 890, 890.1

(56) References Cited

U.S. PATENT DOCUMENTS

| | | | |
|---|---|---|---|
| 3,807,314 A | 4/1974 | Slemmons | |
| 4,732,260 A | 3/1988 | Canziani | |
| 4,738,347 A | * 4/1988 | Brouwer et al. | 198/370.02 |
| 4,896,760 A | * 1/1990 | Triantafilou et al. | 198/370.02 |
| 5,038,912 A | 8/1991 | Cotter | |
| 5,127,510 A | 7/1992 | Cotter et al. | |
| 5,165,515 A | 11/1992 | Nitschke et al. | |
| 5,191,959 A | * 3/1993 | Leemkuil | 198/370.02 |
| 5,217,105 A | * 6/1993 | Sapp et al. | 198/370.02 |
| 5,285,886 A | 2/1994 | Ostholt, Rüdiger et al. | |
| 5,409,095 A | 4/1995 | Hoshi et al. | |
| 5,427,223 A | 6/1995 | Van den Goor | |
| 5,613,591 A | 3/1997 | Heit et al. | |
| 5,732,814 A | 3/1998 | Owczarzak et al. | |
| 5,927,466 A | 7/1999 | Rowley | |
| 5,967,289 A | 10/1999 | Kelsey | |
| 6,139,240 A | 10/2000 | Ando | |

FOREIGN PATENT DOCUMENTS

| | | |
|---|---|---|
| EP | 0648694 | 12/1998 |
| GB | 2242409 | 10/1991 |
| JP | 7061570 | 3/1995 |
| JP | 7315561 | 12/1995 |
| JP | 8319021 | 12/1996 |
| JP | 0952621 | 2/1997 |
| JP | 0103518 | 1/2000 |

OTHER PUBLICATIONS

International Search Report from corresponding Patent Cooperation Treaty Application No. PCT/EP01/04746.

* cited by examiner

*Primary Examiner*—Khoi H. Tran
(74) *Attorney, Agent, or Firm*—Van Dyke, Gardner, Linn & Burkhart, LLP

(57) ABSTRACT

A positive displacement sorter, preferably of the parallel displacement type, includes a conveying surface, a plurality of pusher shoes capable of travelling laterally of the conveying surface, a plurality of diverting rails extending diagonally under the conveying surface and a plurality of electromagnetic actuators associated with the diverting rails. The pusher shoes include a transfer assembly below the conveying surface including a pilot member made of a magnetically permeable material. A pusher shoe is diverted to one of the diverting rails by the actuator associated with the diverting rail magnetically attracting the pilot member associated with that pusher shoe to magnetically initiate a divert. The transfer member associated with the pusher shoe mechanically completes the divert that is initiated magnetically. This allows actuators to be positioned at a pitch that is no greater than the shoe pitch.

72 Claims, 15 Drawing Sheets

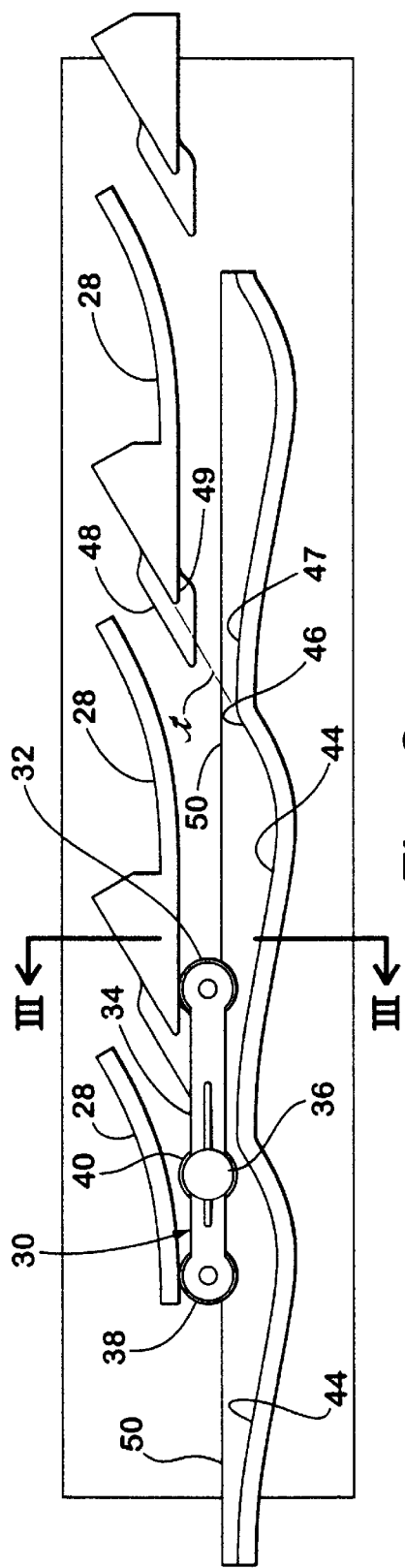
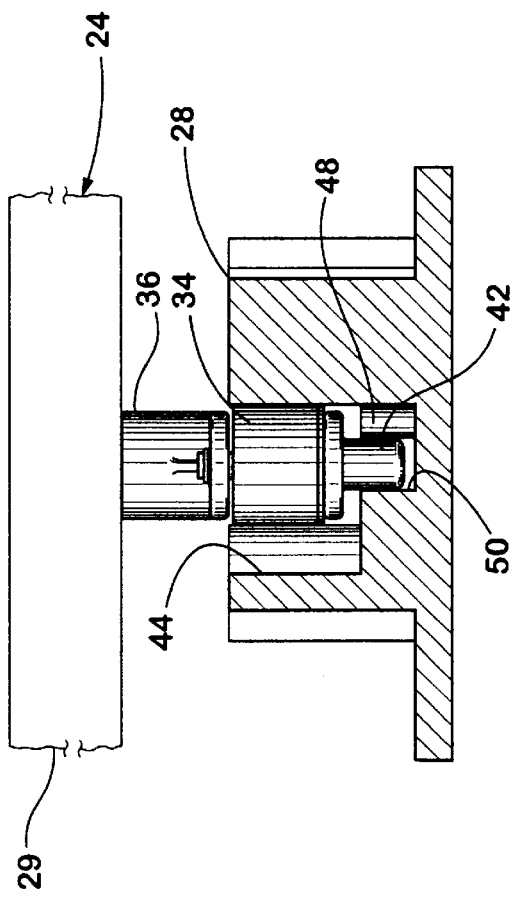
Fig. 2
Fig. 3

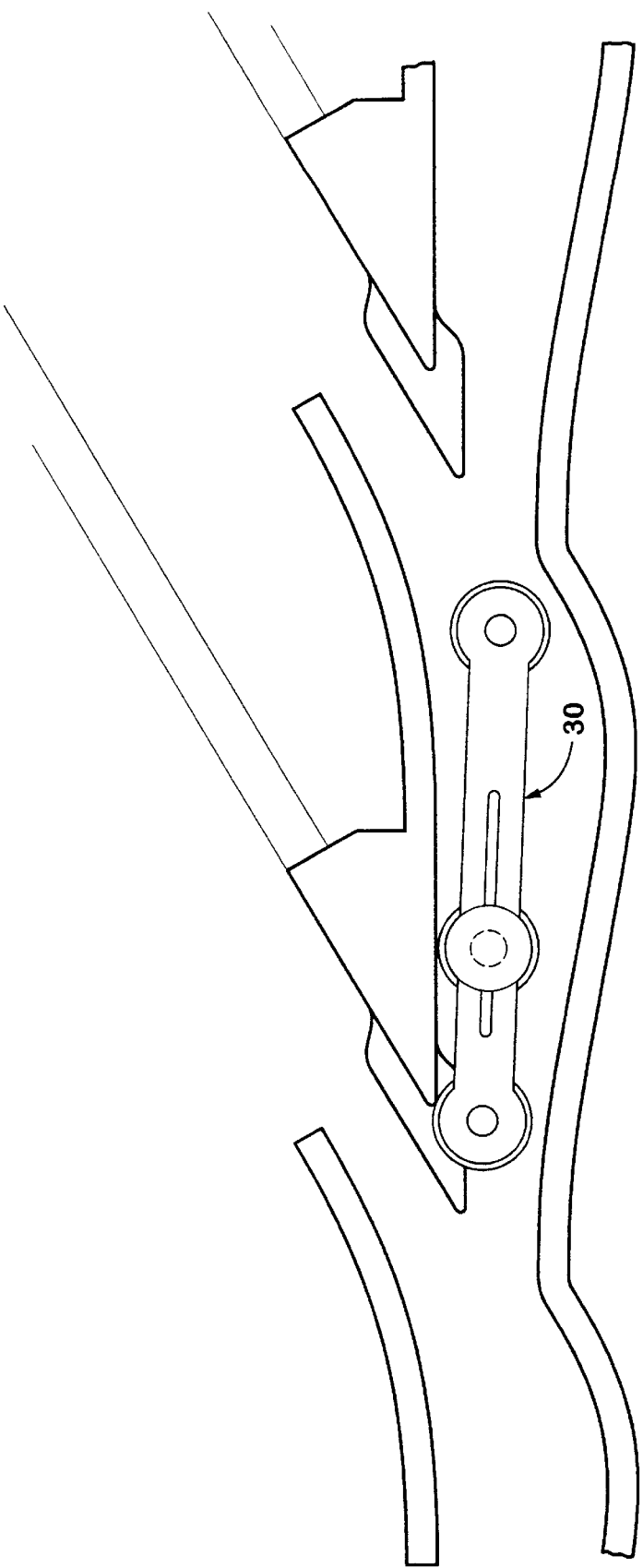

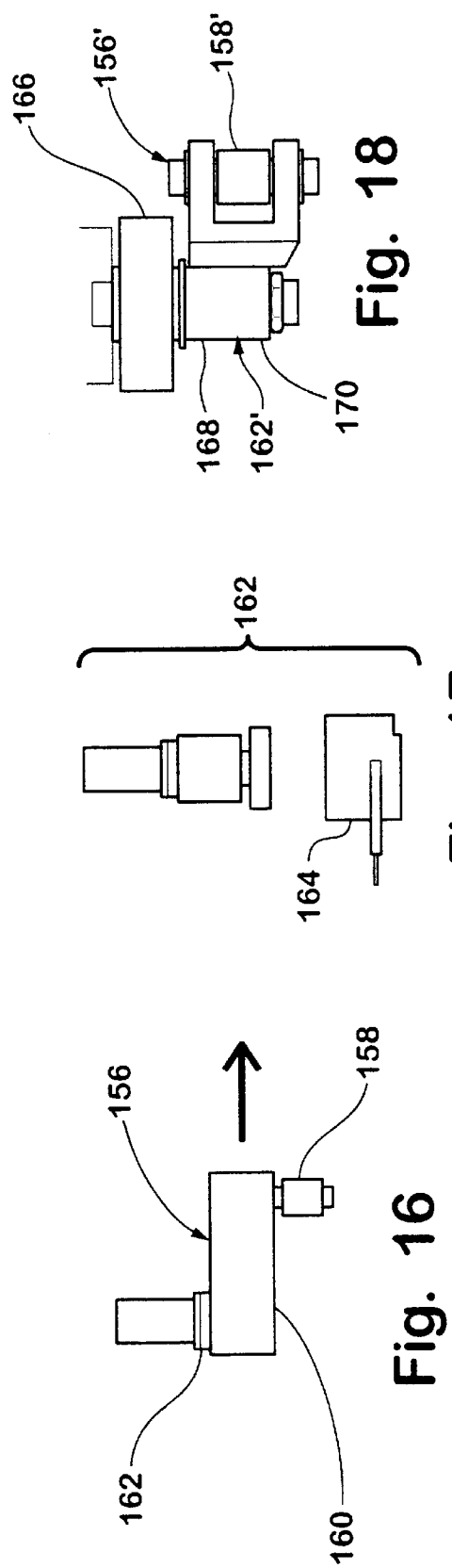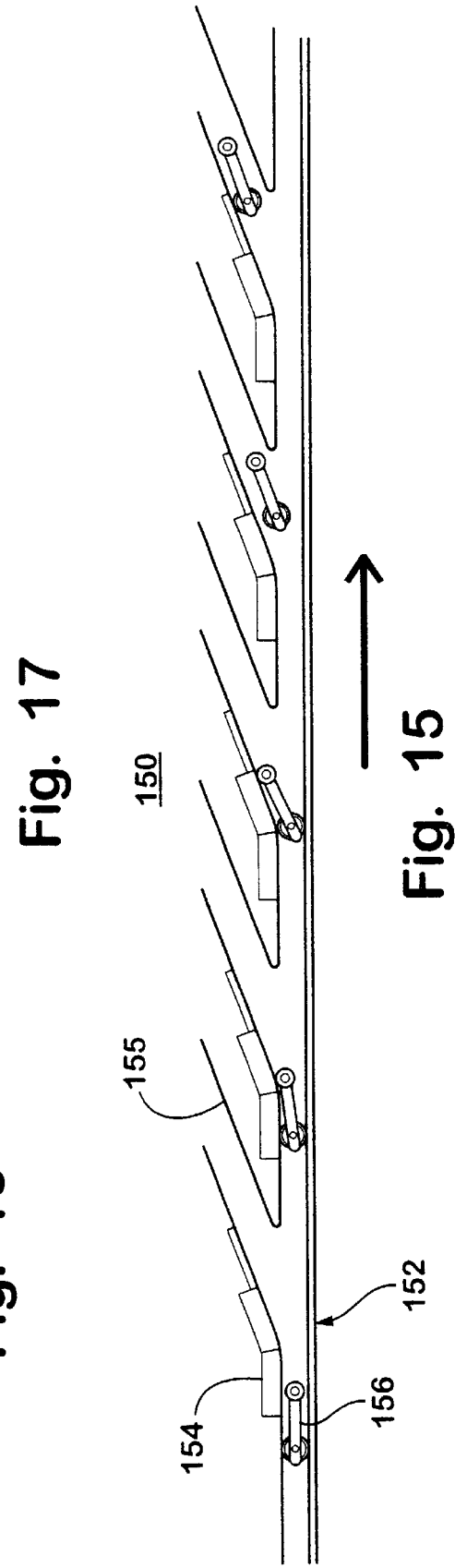

SORTATION SYSTEM DIVERTER SWITCH

CROSS-REFERENCE TO RELATED APPLICATIONS

This application claims priority from U.S. provisional patent application Ser. No. 60/200,183, filed on Apr. 27, 2000, and U.S. provisional patent application Ser. No. 60/235,108, filed on Sep. 25, 2000, the disclosures of which are hereby incorporated herein by reference in their entirety.

BACKGROUND OF THE INVENTION

This invention relates generally to conveyor sortation systems, or sorters, and, in particular, diverters used in such sortation systems. The invention is especially useful with sortation systems that, at least initially, divert articles without imparting a rotational motion on the article, also known as a parallel sorter. However, the invention is capable of other applications.

Various forms of conveyor sortation systems have been known, such as paddle diverters, pushers, pop-up chain and belt transfer assemblies, and the like. One particular advantageous form of a sortation system is a positive displacement sortation system in which a series of pusher shoes are mounted to travel in the direction of the conveying surface and, when diverted, to travel laterally along the conveying system to divert articles on the conveying surface. For example, articles may be diverted to takeaway conveyors, or spurs, arranged either on one side of the conveying surface, thereby defining a unilateral divert, or on both sides of the conveying surface, thereby defining a bilateral divert. The pusher shoes are propelled laterally by a propelling assembly extending below the conveying surface and selectively engaging a diverter rail which extends diagonally under the conveying surface. Diverters associated with the diverting rail selectively divert the propelling assemblies onto the associated diverting rail in order to cause the pusher shoes to travel laterally of the conveying surface. If a particular pusher shoe is not diverted onto a particular diverting rail, then the shoe continues to travel solely in the direction of the conveying surface unless a downstream diverter diverts the pusher shoe onto its associated diverter rail. Examples of such positive displacement sorters are disclosed in commonly assigned U.S. Pat. Nos. 4,738,347 and 5,127,510, the disclosures of which are hereby incorporated herein by reference. Other examples of positive displacement sorters are disclosed in U.S. Pat. Nos. 3,361,247 and 4,884,677.

One form of a diverter is disclosed in U.S. Pat. 5,409,095, the disclosure of which is hereby incorporated herein by reference. The '095 patent discloses a diverter made up of an electromagnet that, when energized, attracts the propelling assembly of the pusher shoe and guides the propelling assembly onto the associated diverting rail. In the embodiment illustrated in the '095 patent, the propelling assembly includes a bearing made of a ferromagnetic, or magnetically permeable, substance, such as iron alloy. The electromagnet, when energized, attracts the bearing thereby diverting the associated pusher shoe onto the diverting rail associated with the diverter. The electromagnetic diverter disclosed in the '095 patent is desirable because it is capable of diverting pusher shoes traveling at a high rate of speed thereby increasing the throughput of articles sorted by the sorter. Additionally, the pusher shoes can be diverted with less noise than is produced with mechanical or electromechanical diverters.

A particularly advantageous form of a sorter is one which, at least initially, diverts articles without rotating the articles. Such a parallel divert sorter is disclosed in commonly assigned U.S. Pat. Nos. 5,165,515; 5,927,465 and 6,041,909 and pending U.S. patent application Ser. No. 09/606,610 filed Jun. 29, 2000, by J. Shearer, Jr. et al. entitled CONVEYOR SYSTEM WITH DIVERTING TRACK NETWORK, the disclosures of which are hereby incorporated herein by reference. Because the articles are at least initially diverted without rotating the articles, it is possible to include a smaller gap between articles because it is not necessary to leave sufficient gap for rotation of the articles. This also improves the throughput of the sorter. One difficulty of using an electromagnetic diverter with a parallel divert sorter is that it may be necessary to space the diverting rails and diverters as close together as the pitch between the pusher shoes. Because pusher shoe pitch may be as low as 5 or 6 inches, it may be necessary to utilize as low as 5-inch or 6-inch spacing between magnetic diverters. Because of the electromagnetic force necessary to attract the bearing of a pusher shoe in order to divert that pusher shoe onto a diverting rail, the size of the electromagnetic diverter becomes prohibitive for use in a parallel divert sorter of the type disclosed in the '515, '465, and '909 patents and the U.S. Pat. No. 09/606,610 pending application.

SUMMARY OF THE INVENTION

According to one aspect of the invention, a positive displacement parallel sorter includes a conveying surface, a plurality of pusher shoes capable of traveling laterally of the conveying surface to divert articles on the conveying surface, a plurality of diverting rails extending diagonally under the conveying surface and a plurality of diverters made up of electromagnetic actuators associated with the diverting rails. Corresponding portions of the pusher shoes are separated from each other in the direction of travel of the conveying surface by a shoe pitch. The actuators are substantially separated from each other by no more than the shoe pitch. The pusher shoes include a transfer assembly below the conveying surface having a pilot member made of a magnetically permeable material. A pusher shoe is selectively diverted to one of the diverting rails by the actuator associated with that diverting rail magnetically attracting the pilot member associated with that pusher shoe to magnetically initiate a divert. The transfer assembly associated with the pusher shoe mechanically completes the divert that is magnetically initiated. Because the magnetic assembly is diverting the pilot and not the entire shoe, the required diverting force is significantly less. Therefore, the size of the electromagnetic diverter may be substantially reduced to accommodate close spacing.

According to another aspect of the invention, a positive displacement parallel sorter includes a conveying surface, a plurality of pusher shoes capable of travelling laterally of the conveying surface to divert articles on the conveying surface, a plurality of diverting rails extending diagonally under the conveying surface and a plurality of electromagnetic actuators associated with the diverting rails. The pusher shoes include a transfer assembly below the conveying surface. The transfer assembly includes a pilot member made up of a magnetically permeable material, an intermediate low-friction member and a trailing low-friction member. The low-friction members are made up of a non-magnetically permeable material. The pilot member, intermediate member, and trailing member are commonly mounted on a toggle member that is pivotally mounted with respect to the article-contacting member of the pusher shoe. A divert is initiated by one of the actuators attracting the pilot member. This provides a diverting arrangement which diverts within a minimum amount of force and in a minimum amount of space.

According to another aspect of the invention, a sorter includes a conveying surface, a plurality of pusher shoes capable of travelling laterally of the conveying surface, the pusher shoes having article-contacting members extending at least partially above the conveying surface to divert articles on the conveying surface. A plurality of diverting rails extend diagonally under the conveying surface and a plurality of diverters are associated with the diverting rails. The pusher shoes include a transfer assembly below the conveying surface. Each of the diverters includes an actuator for selectively diverting the laterally propelling assembly toward the associated one of the diverting rails to initiate a divert and a stationary curved surface for guiding the transfer assembly towards the associated one of the diverting rails. This arrangement substantially reduces noise resulting from the required change in direction of the lateral propelling assembly as it is diverted towards the associated diverting rail. Preferably, the tangent of a portion of the curved surface is aligned with the associated ones of the diverting rails in order to direct the transfer assembly toward the associated one of the diverting rails.

According to another aspect of the invention, a sorter includes a conveying surface, a plurality of pusher shoes capable of travelling laterally of the conveying surface, the pusher shoes having article-contacting members extending at least partially above the conveying surface to divert articles on the conveying surface. A plurality of diverting rails extend diagonally under the conveying surface and a plurality of diverters are associated with the diverting rails. The pusher shoes include a transfer assembly below the conveying surface. The diverters include an actuator for selectively actuating the transfer assembly toward the associated one of the diverting rails to initiate a divert. The diverters include a guide rail. The lateral propelling assembly passes between the actuator and the guide rail when not being diverted. A magnet and magnetically permeable material are provided, respectively, on the transfer assembly and the guide rail, or vice versa, to maintain contact between the transfer assembly and the guide rail when the lateral propelling assembly is not being diverted. This reduces the possibility of a false divert.

According to another aspect of the invention, a sorter includes a conveying surface, a plurality of pusher shoes capable of travelling laterally of the conveying surface, the pusher shoes having article-contacting members extending at least partially above the conveying surface to divert articles on the conveying surface. A plurality of diverting rails extend diagonally under the conveying surface and a plurality of diverters are associated with the diverting rails. The pusher shoes include a transfer assembly below the conveying surface for transferring that pusher shoe when engaging one of the diverter rails. Each of the diverters includes an actuator for selectively actuating the transfer assembly toward the associated one of the diverting rails. The sorter further includes means for ensuring that an initiated divert of the transfer assembly will be completed.

These and other objects, advantages and features of this invention will become apparent upon review of the following specification in conjunction with the drawings.

BRIEF DESCRIPTION OF THE DRAWINGS

FIG. 2 is a top plan view of the sorter in FIG. 1;

FIG. 3 is a sectional view taken along the lines III—III in FIG. 2;

FIGS. 7a–7c are diagrams illustrating operation of a diverter shoe that is not according to the invention;

FIG. 13 is a sectional view taken along the lines XIII—XIII in FIG. 10a;

FIG. 15 is the same view as FIG. 1 of yet another alternative embodiment thereof; and FIG. 16 is a side elevation of a lateral propelling assembly of the embodiment in FIG. 15;

FIG. 17 is an exploded side elevation of a portion of the lateral propelling member of FIG. 16; and FIG. 18 is the same view as FIG. 16 of yet another alternative embodiment thereof.

DESCRIPTION OF THE PREFERRED EMBODIMENT

Figure 1:
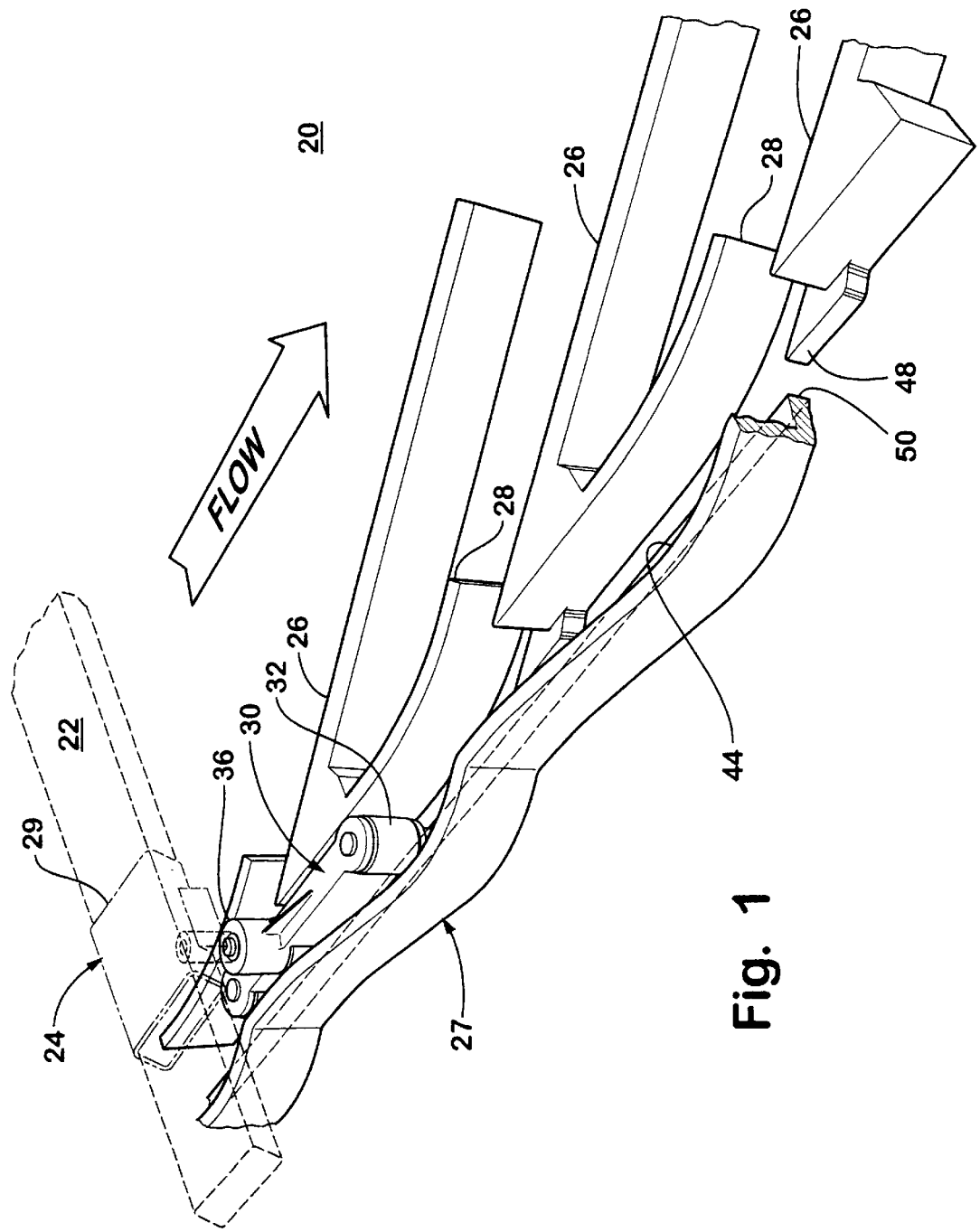
FIG. 1 is a perspective view of a sorter according to the invention with the conveying surface removed to reveal the underlying structure thereof.

Referring now specifically to the drawings, and the illustrative embodiments depicted therein, a sorter 20 includes a conveying surface 22 and a plurality of pusher shoes 24 capable of traveling laterally of conveying surface 22. Sorter 20 further includes a plurality of diverting rails 26 extending diagonally under conveying surface 22 and a plurality of electromagnetic actuators 28 associated with the diverting rails 26. Preferably, conveying surface 22 is made up of a series of slats of the type generally disclosed in U.S. Pat. No. 5,127,510, the disclosure of which is hereby incorporated herein by reference, and pusher shoes 24 have a gliding portion adapted to glide along the slats defining conveying surface 22 and an article diverting member 29 above conveying surface 22 for diverting articles traveling on conveying surface 22 in a similar fashion to the disclosure in the '510 patent. However, the detailed configuration of the conveying surface and the glide portion and diverting portion of the pusher shoes forms no part of the present invention and may be configured as other designs known in the art.

Pusher shoe 24 includes a transfer assembly 30 for transferring to one of the diverting rails 26 upon actuation of a corresponding actuator. In the illustrated embodiment, transfer assembly 30 also propels pusher shoe 24 laterally of the conveying surface by engaging one of the diverting rails 26. However, a separate bearing (not shown) could alternatively be provided in addition to the transfer assembly to engage the diverting rail once the transfer assembly is transferred by actuation of an actuator. Transfer assembly 30 includes a pilot member 32 which is made of a magnetically permeable material, such as iron alloy or other ferromagnetic substance. Pilot member 32 is selectively attracted by any of the actuators 28 which are electromagnets. As is understood in the art, when an electromagnet is actuated by applying an electrical current to a coil, it produces a magnetic attraction on magnetic permeable materials which causes a passing pilot member 32 to be attached to actuator 28. With pilot member 32 attracted to electromagnetic actuator 28, the forward movement of the diverted pusher shoe 24 causes the pilot member 32 to follow the curvature of the actuator thereby positioning the pilot member at a leading portion 49 of the associated diverting rail 26. As will be set forth in more detail below, transfer assembly 30 mechanically interacts with diverter assembly 27 in a manner which causes the entire transfer assembly 30 to follow pilot member 32 in the direction of and ultimately in contact with diverting rail 26, thereby mechanically completing the divert of the pusher shoe with lateral propelling member 30 on the diverting rail 26, the divert having been initiated magnetically. Furthermore, transfer assembly 30 and diverter assembly 27 are configured such that when actuator 28 is not attracting pilot member 32, the lateral propelling assembly is configured to move in a forward direction, namely the direction of movement of conveying surface 22, as will be explained in more detail below.

Figure 4:
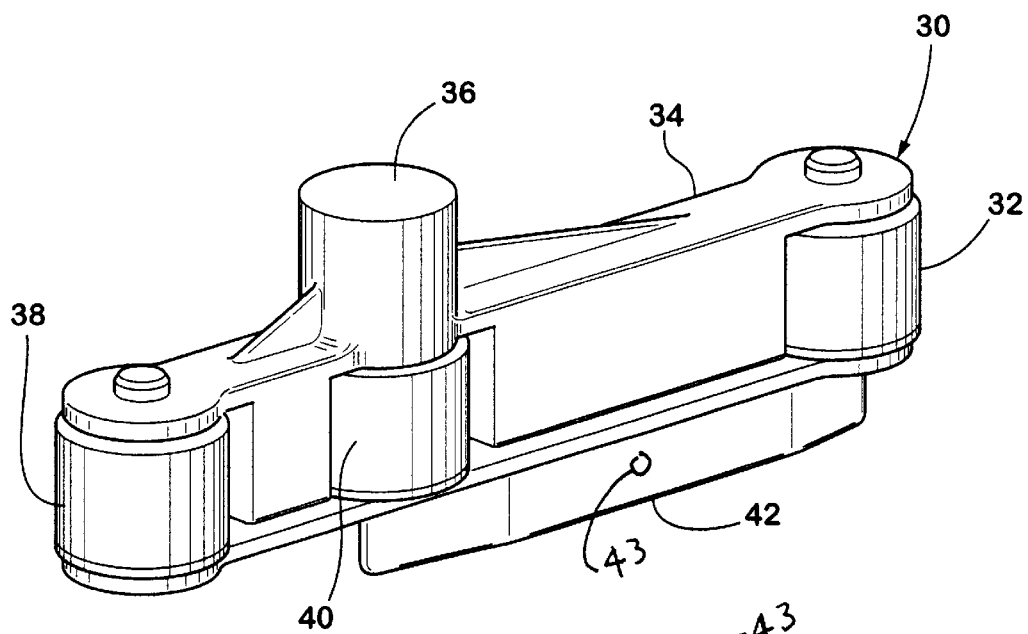
FIG. 4 is a perspective view of a lateral propelling assembly taken from a top side view thereof.
Figure 5:
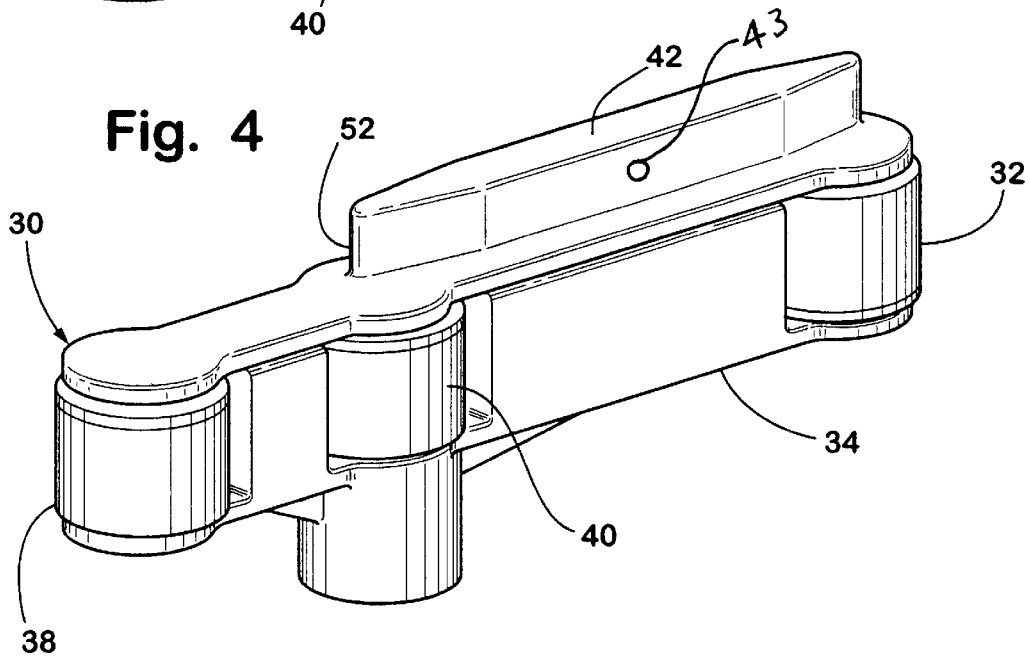
FIG. 5 is a perspective view of the lateral propelling assembly in FIG. 4 taken from a bottom side view thereof.

Transfer assembly 30 preferably includes a toggle 34 which is rotatably mounted to pusher shoe diverting portion 29 by a rotary coupling 36 (FIGS. 4 and 5). Transfer assembly 30 further includes at least a trailing low-friction member 38 and, preferably, an intermediate low-friction member 40. In the illustrative embodiment, pilot member 32 is a roller made from a magnetically permeable material, such as iron, steel, or the like, and trailing intermediate low-friction members 38 and 40 are preferably rollers made from a non-magnetically permeable material, such as stainless steel, plastic, aluminum, or the like. By making trailing and intermediate low-friction members 38, 40 from a non-magnetically permeable material, the actuation of diverter actuator 28 should not impact the trailing or intermediate low-friction members of the preceding lateral propelling assembly. In the illustrated embodiment, pilot member 32 and low-friction members 38, 40 are shown as rollers. However, they could also be non-rotating skid members. If low-friction members 38, 40 are skids, they would preferably be made of a self-lubricating polymeric material.

Sorter 20 additionally includes a means for ensuring that an initiated divert will be successfully completed. In the illustrative embodiment, such means includes a vane 42 which extends downwardly from toggle 30. Such means additionally includes a nose 48 which extends from diverting rail 26 toward curved surface 44. The purpose of nose 48 is to reduce the gap between surface portion 47 and 49, so that vane 42 spans the gap between guide rail 50 and nose 48, as trailing low-friction member 38 moves off curved surface 44 and before low-friction member 40 is guided by diverting rail 26. Furthermore, vane 42 ensures that, once the leading pilot member is diverted, the entire transfer assembly 30 will be diverted onto the diverting rail 26. In the illustrative embodiment, vane 42 is an elongated unitary member which is preferably boat-shaped. As will be set forth in more detail below, other shapes for vanes 42 may be utilized. Vane 42 is preferably made from a self-lubricating polymeric material.

Figure 6A:
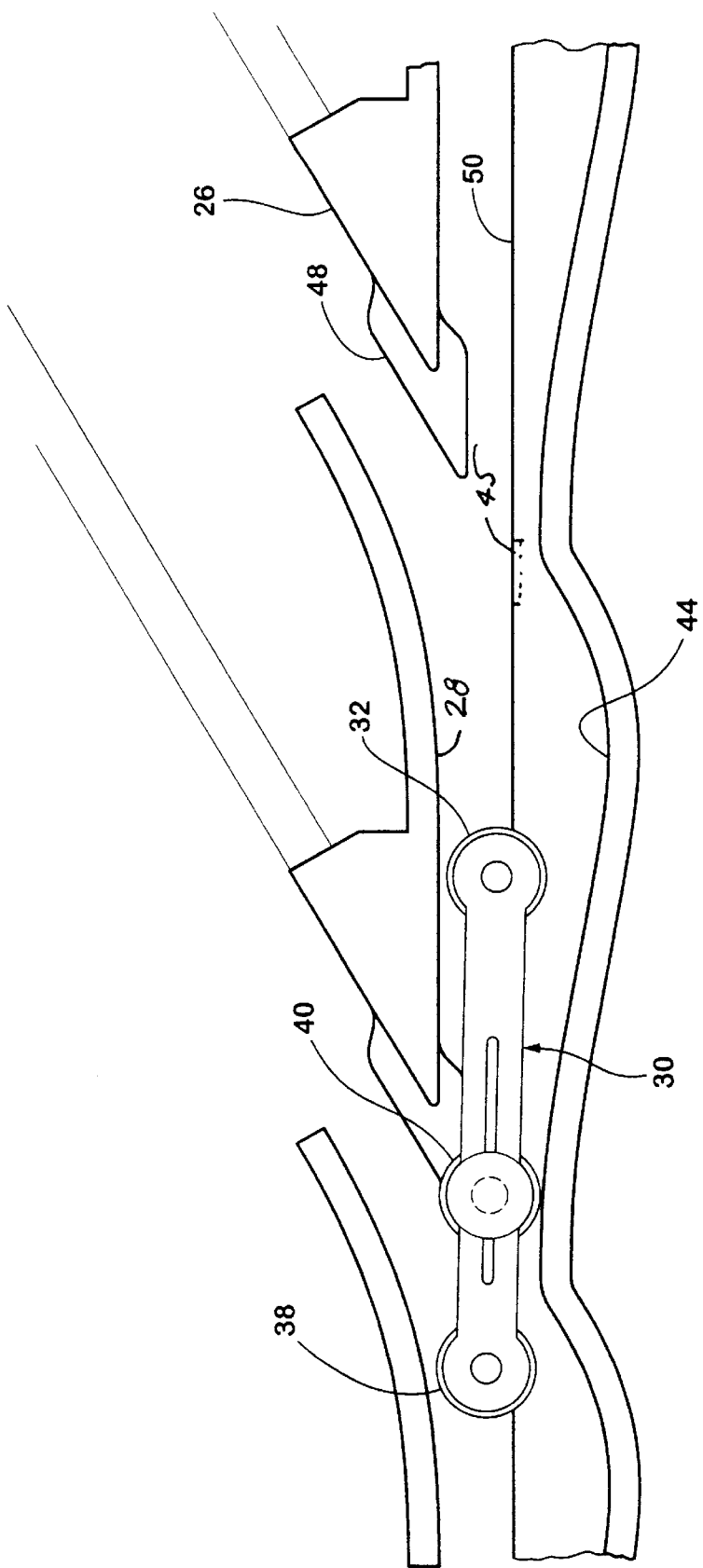
FIGS. 6a–6d are diagrams illustrating phases of diverting of a pusher shoe of the sorter in FIG. 1.
Figure 6B:
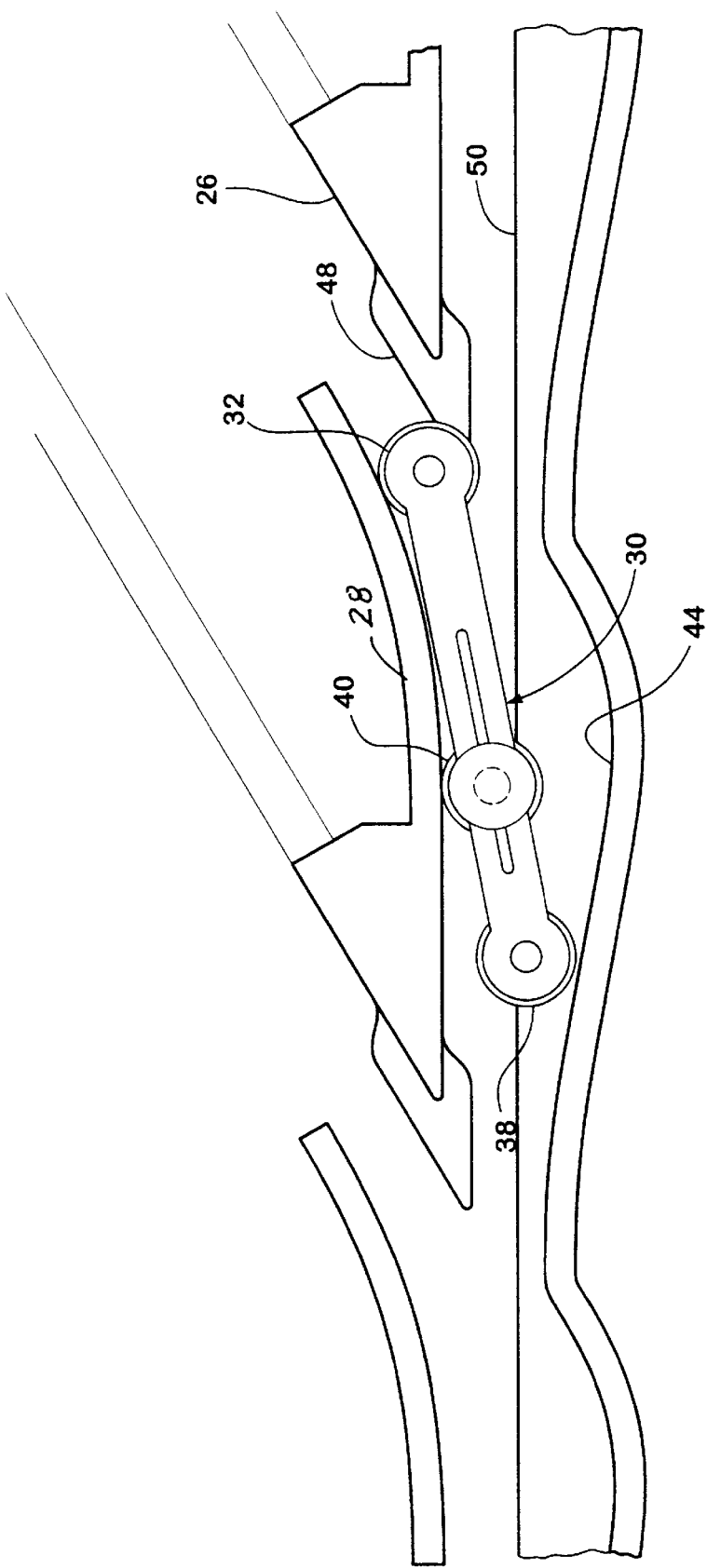
Figure 6C:
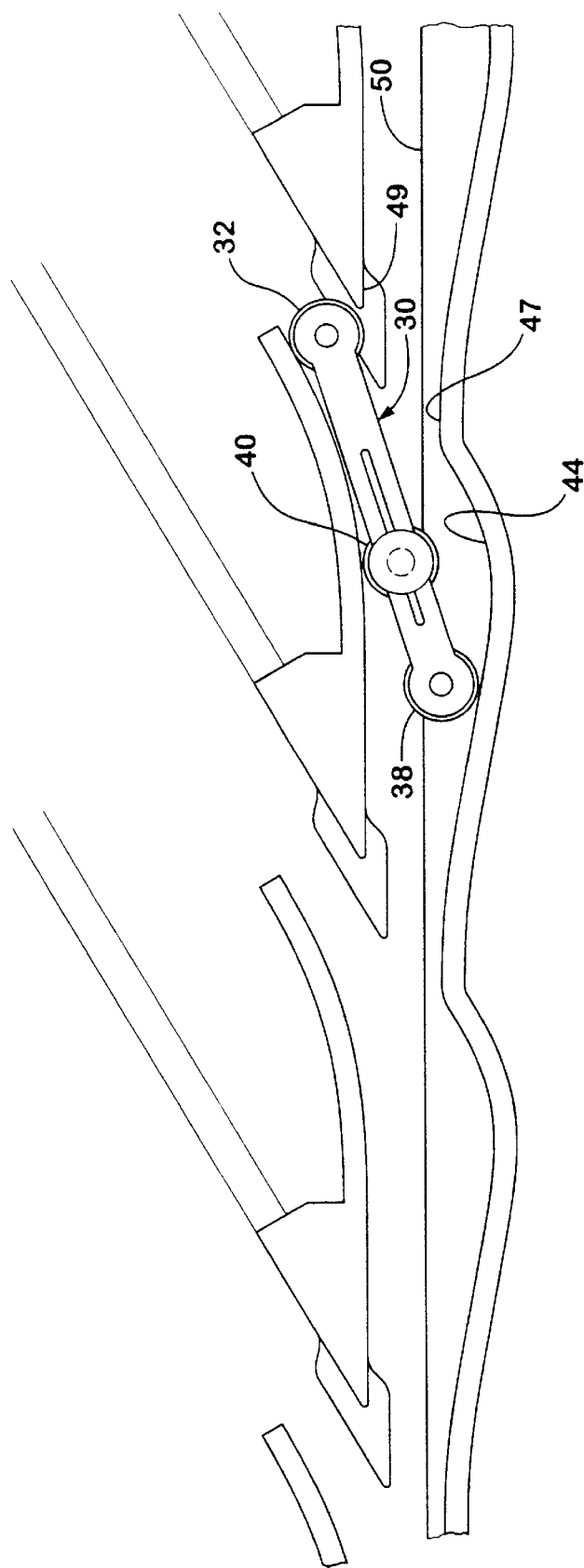
Figure 6D:
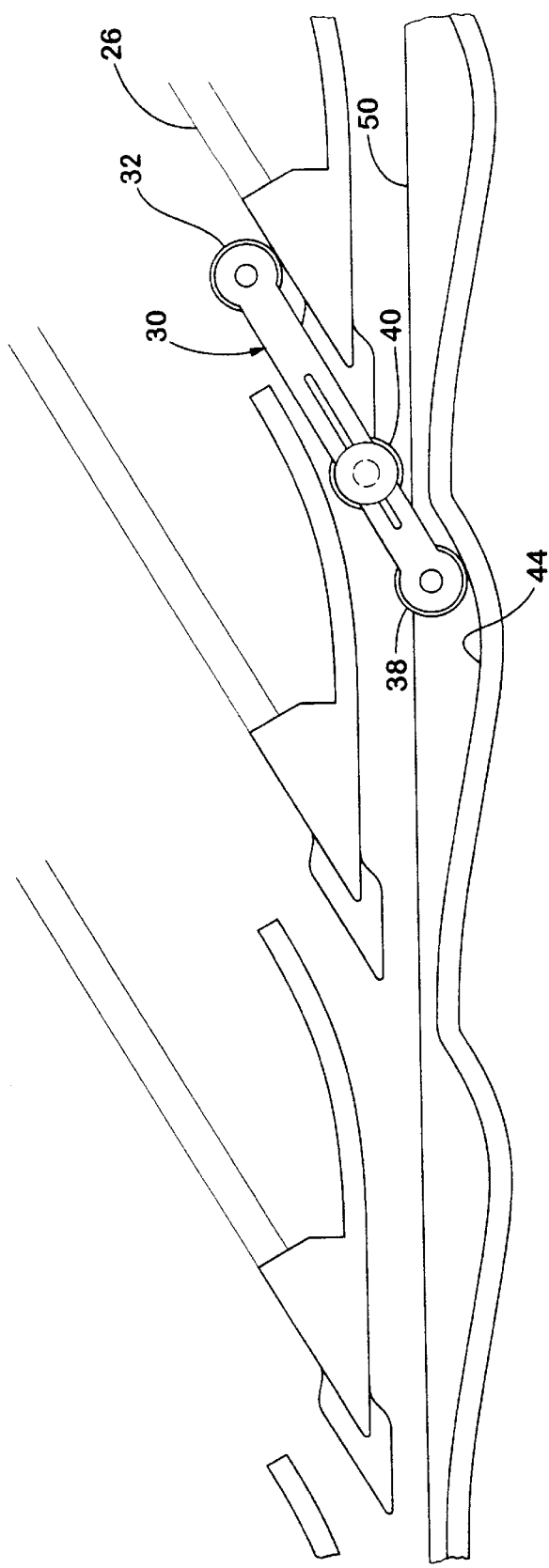

By way of example, in FIG. 6a, the entire transfer assembly 30 is traveling in the direction of travel of conveying surface 22. If diverter actuator 28 is actuated, pilot member 32 is magnetically attracted to actuator 28, as seen in FIG. 6b. As pilot member 32 moves in the direction of diverting rail 26, vane 42 is intercepted by nose 48, thus ensuring that pilot member 32 will make contact with diverter rail 26. As seen in FIG. 6d, vane 42 continues in close proximity to, or engagement with, nose 48 thereby ensuring that trailing low-friction member 38 also travels in the direction of diverting rail 26.

Each diverter assembly 27 further includes a guide rail 50 and a stationary curved surface 44. Curved surface 44 terminates at a portion 46 having a tangent T aligned with diverting rail 26 (FIG. 2). The purpose of curved surface 44 is to intercept trailing low-friction member 38 in a gentle non-abrupt manner as pilot member 32 is attracted to diverter actuator 28 as illustrated in FIGS. 6a–6d. The purpose of portion 44 having a tangent T aligned with diverting rail 26 is in order to guide trailing low-friction member 28 in the direction of diverting rail 26. A trailing portion 46 of one curved surface 44 continuously joins a leading portion 47 of an adjacent curved surface.

Although transfer assembly 30 is illustrated with three low-friction members, which are preferably rollers, the lateral propelling assembly could be diverted without an intermediate low-friction member. The purpose of the intermediate low-friction member is to carry a portion of the load of the divert as the transfer assembly 30 travels along the diverting rail 26. Intermediate low-friction member 40 is preferably positioned at rotary coupling 36 such that toggle 34 pivots about the axis of rotation of intermediate low-friction member 40. The distance between trailing low-friction member 38 and rotary coupling 36 is preferably substantially less than the distance between pilot member 32 and rotary coupling 36. This allows pilot member 32 to transition fully across the guide path between surface portions 47 and 49 with pilot member 32 in contact with diverter actuator 28, during diverting of the transfer assembly 30, while keeping the overall length of toggle 34 to a minimum. This reduces the width of diverting assembly 27 allowing it to be less than or equal to the center-to-center distance, or pitch, between diverter shoes 24. As previously set forth, the diverting motion is carried by pilot member 32 and trailing low-friction member 38.

Advantageously, by utilizing a pilot member to be attracted by electromagnetic diverter actuator 28, a substantially reduced magnetic attraction may be utilized to initiate the divert. Once the divert is initiated by diverting pilot member 32, the divert is carried out mechanically utilizing pilot member 32, trailing low-friction member 38 and vane 42 in the manner previously described. Because a reduced attraction force is required, the power and, therefore, the size of magnetic actuator 28 is reduced allowing the ability to separate diverting assemblies 27 by no more than the pitch of the pusher shoes 24. This facilitates parallel diverting of articles, as will be understood by the skilled artisan. Pitch refers to the spacing between like portions of adjacent pusher shoes. Preferably, magnetic actuators can have a pitch, or spacing between like portions of adjacent diverter assemblies, of between 4 inches and 8 inches and, most preferably, approximately 6 inches.

Figure 7B:
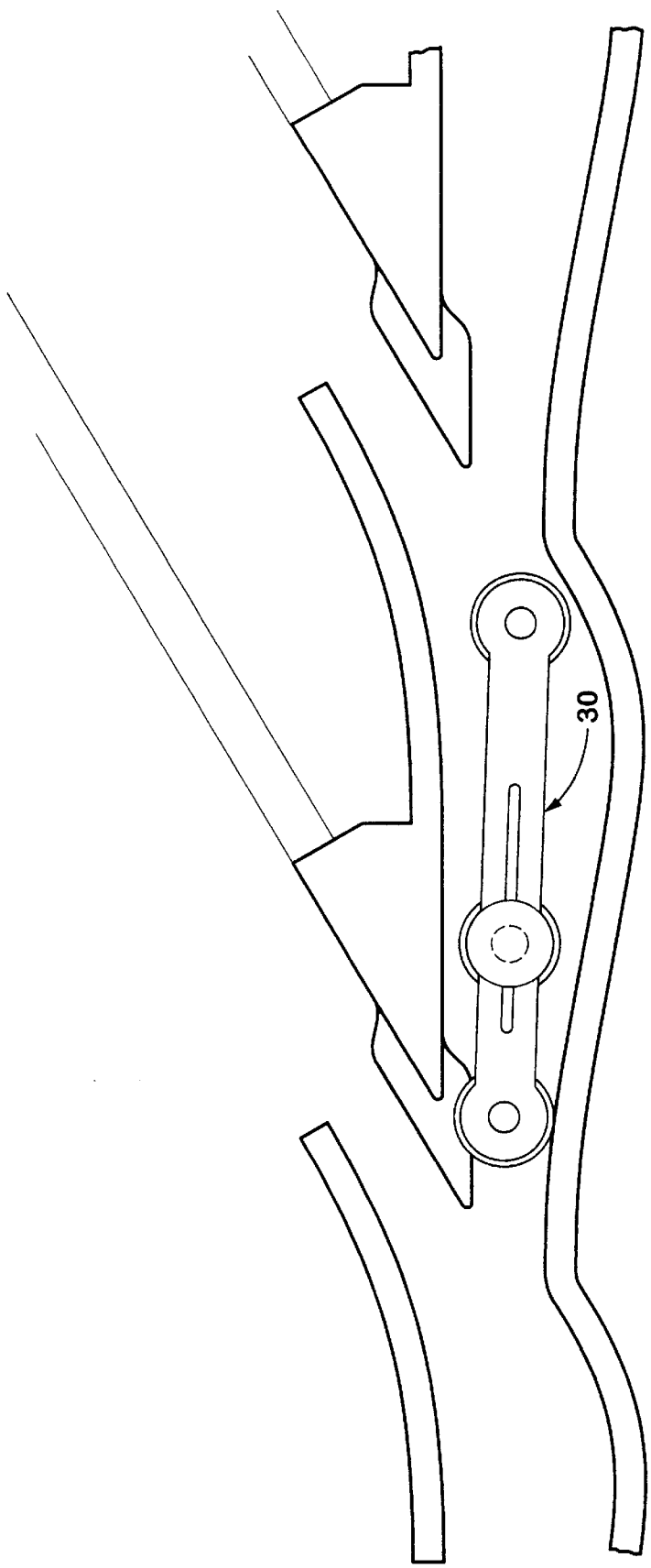
Figure 7C:
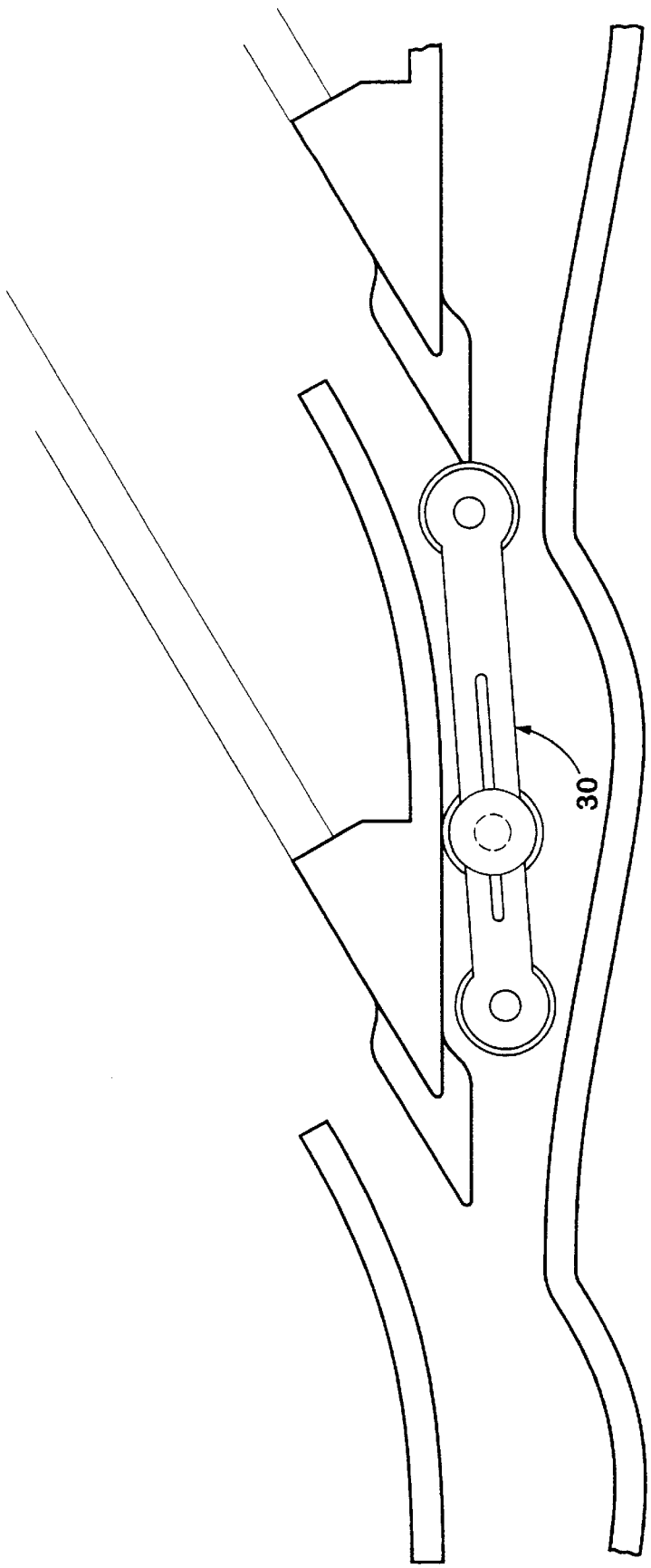
Figure 8:
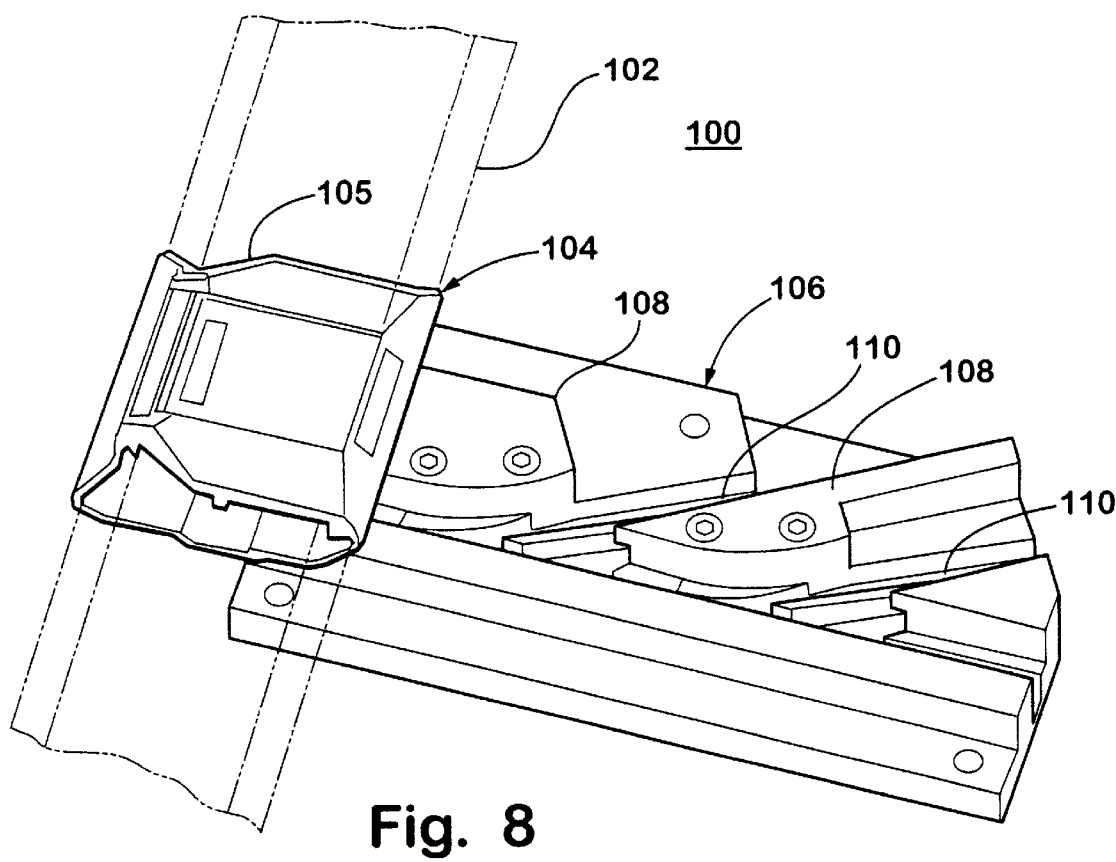
FIG. 8 is the same view as FIG. 1 of an alternative embodiment thereof.
Figure 9:
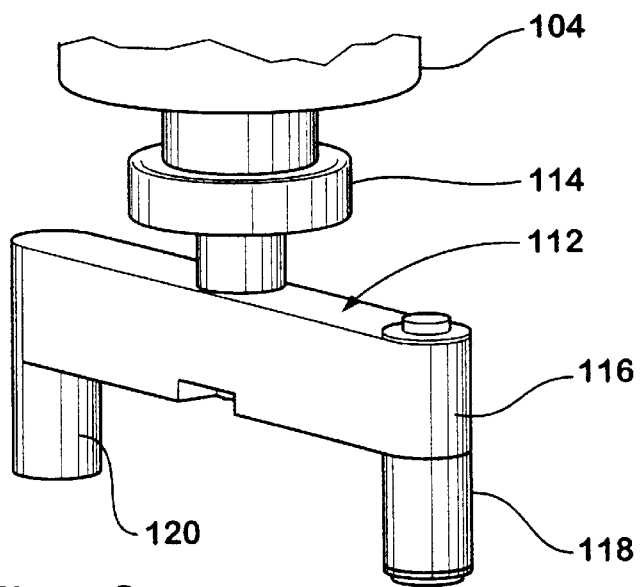
FIG. 9 is a perspective view of a lateral propelling assembly for the embodiment in FIG. 8.

Guide rail 50 extends in the direction of travel of conveying surface 22 and is positioned at the vertical height of vane 42 (FIG. 3). Guide rail 50 functions primarily to prevent transfer assembly 30 from drifting laterally into contact with curved surface 40 as illustrated in FIGS. 7a and 7b. Were laterally propelling assembly 30 allowed to contact curved surface 44, then it is possible that the contact between curved surface 44 and pilot member 32 may create a false divert as illustrated in FIG. 7c. Furthermore, incidental contact between pilot member 32 and curved surface 44 may create an undesirable noise. A trailing portion 52 of vane 42 is configured to avoid interference with guide rail 50 as pilot member 32 follows diverter actuator 28, as transfer assembly 30 is diverted as best seen in FIGS. 6b and 6c. Additionally, it may be desirable to provide a weak permanent magnet 43 in either guide rail 50 or vane 42 and a magnetically permeable member 45 in the other of the guide rail and the vane in order to attract the vane to the guide rail at least as the lateral propelling assembly traverses each diverter assembly. This helps to avoid the pilot member 32 from inadvertently drifting in the direction of diverting rail 26 and thereby inadvertently being diverted in the manner illustrated in FIG. 7c.

Thus, it is seen that vane 42 provides many useful features. These include the ensuring that the pilot member 32 is completely diverted to the associated diverting rail and that, once initiated, the divert is completed. This is provided by the spanning of vane 42 from guide rail 50 to nose 48. Vane 42 also serves to prevent pilot member 32 from contacting surface portions 46, 47 or 49 as transfer assembly 30 travels past a diverter assembly for which a divert is not intended. Additionally, by providing an attraction force between vane 42 and guide rail 50, the transfer assembly 30 is substantially prevented from drifting toward diverting rail 26 where an inadvertent divert may occur. Although the vane 42 is illustrated as an elongated boat-shaped member, other shapes would suggest themselves to the skilled artisan. For example, it is possible that vane 42 may be made up of a pair of members which are spaced apart, wherein the leading of the vanes is positioned at the leading portion of vane 42 and the trailing of the separate vanes is positioned at the trailing portion 52 of the vane. Other configurations may suggest themselves to the skilled artisan. Curved surface 44 is configured to bring trailing low-friction member 38 into contact with the curved surface as gently as possible preferably just after the pilot member 32 is past diverter actuator 28 and to guide the trailing low-friction member to the direction T of diverting rail 26. This reduces any force that would be created by an abrupt contacting of the trailing low-friction member with the curved surface separating the pilot member 32 from the diverter actuator 28. In particular, contact is avoided until the pilot member 32 is engaged with diverting rail 26.

In the illustrative embodiment, toggle 34 may be made from molded magnesium, dicast aluminum, reinforced plastic, or the like. Pilot member 32 may be manufactured from a magnetically permeable material, such as steel, while trailing intermediate low-friction members 38, 40 are preferably made from a non-magnetically permeable material, such as stainless steel or plastic. Because the present invention utilizes the attraction between a leading pilot member and the diverter actuator while carrying out the actual divert mechanically, it is not necessary to utilize a permanent magnet downstream of the diverter actuator as utilized in U.S. Pat. No. 5,409,095. In the illustrative embodiment, diverter actuator 28 is an electromagnet utilizing the general principles disclosed in U.S. Pat. No. 5,409,095, the disclosure of which is hereby incorporated herein by reference. However, it may be possible to incorporate additional features into the diverter actuator, such as utilizing a series of separately actuated electromagnets that may be sequentially actuated to further assist in diverting pilot member 32 toward diverting rail 26. It should be understood that the space between guide rail 50 and diverting rail 26 may be open below, in whole or in part, in order to avoid collection of debris which may interfere with the operation of the diverter assembly. Also, an air gap may be maintained between pilot member 32 and an actuator 28 by covering actuators with a non-magnetically permeable sheet, such as plastic, aluminum, or the like. The air gap may reduce the likelihood that residual magnetism in actuator 28 may inadvertently attract pilot member 30.

According to an alternative embodiment, a sorter 100 includes a conveying surface 102, a pusher shoe 104 and a diverter assembly 106 (FIGS. 8–14). Sorter 100 further includes a diverting rail 110 associated with each diverter assembly and a transfer assembly 112 extending downwardly from a diverting portion 105 of pusher shoe 104 such that transfer assembly 112 is below conveying surface 102. Transfer assembly 112 includes a leading pilot member 118 and a trailing low-friction member 120 mounted to a toggle 116. An optional intermediate low-friction member 114 is positioned above toggle 116. Toggle 116 is pivotally joined with pusher shoe 104 in a manner that the toggle pivots about the axis of rotation of intermediate low-friction member 114. The diverter assembly further includes a curved surface 125 and a diverter actuator 108. Sorter 100 further includes a means for ensuring that an initiated divert will be completed. Such means includes a diverting rail extension 124 is positioned between diverting rail 110 and diverter actuator 108.

Figure 10A:
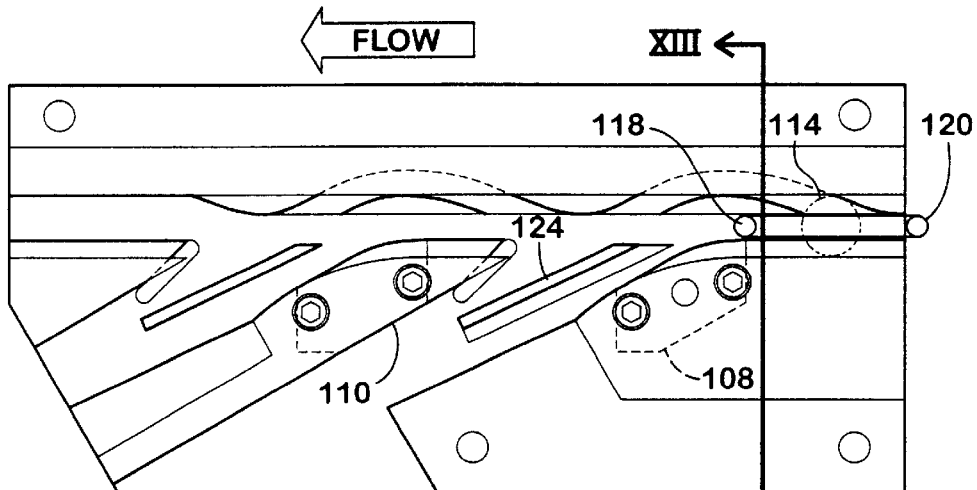
FIGS. 10a–10f are diagrams illustrating phases of diverting a pusher shoe of the embodiment in FIG. 8.
Figure 10B:
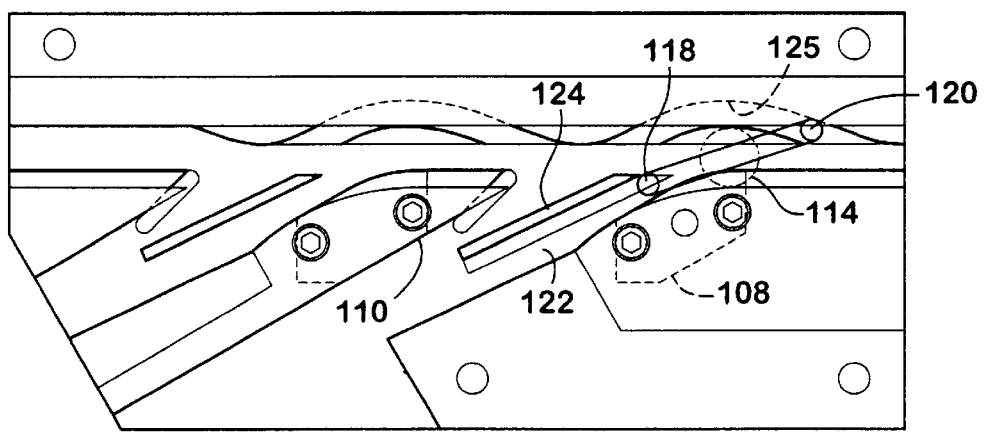
Figure 10C:
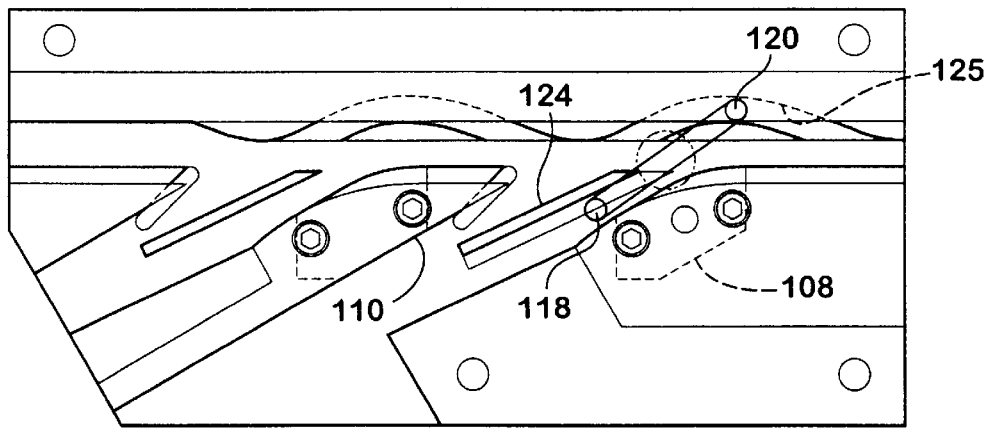
Figure 10D:
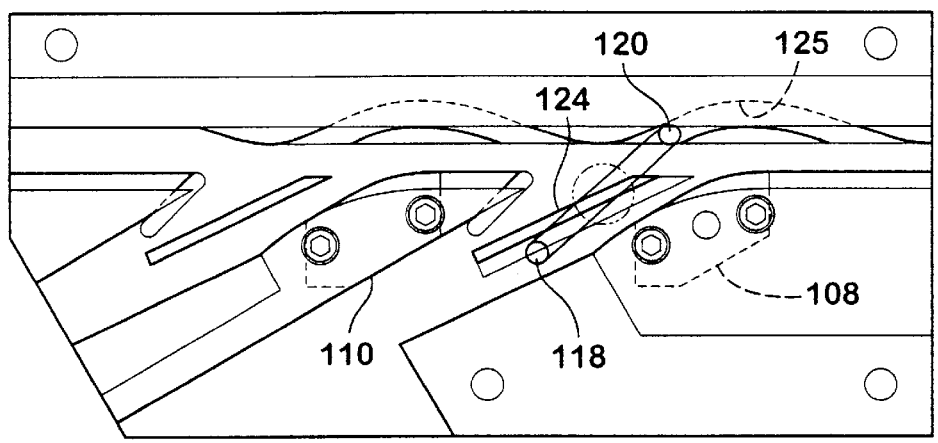
Figure 10E:
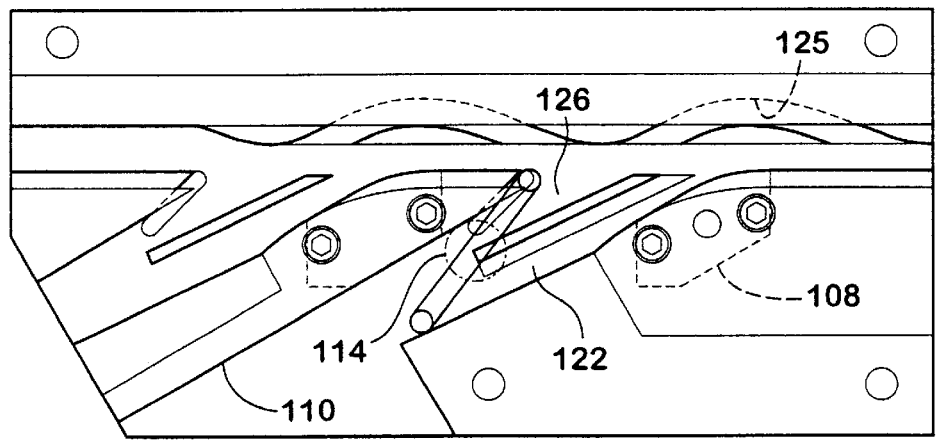
Figure 10F:
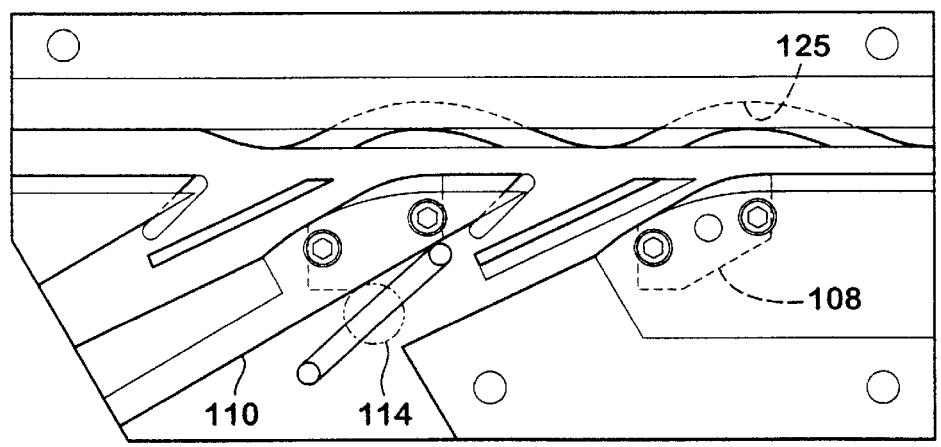

Operation of sorter 100 is illustrated in FIGS. 10a–10c. When diverter actuator 108, which is an electromagnet, is energized, such as by applying an electrical current, it magnetically attracts leading pilot member 118 which is made from a magnetically permeable material. As leading pilot member 118 is attracted to diverter actuator 108, trailing low-friction member 120 engages curved surface 125 in a manner that reduces the generation of any forces that may pull leading pilot member 118 away from diverter actuator 108. As transfer assembly 112 is further actuated, leading pilot member 118 is captured by diverting rail extension 124. Diverting rail extension 124 ensures that once a diverting action is initiated, it will be completed. As leading pilot member 118 moves along diverting rail 124, trailing low-friction member 120, in combination with pilot member 118, bears the force on transfer assembly 112. As leading pilot member 118 travels beyond diverting rail extension 124, intermediate low-friction member 114 engages diverting rail 110 and bears the force of the movement of transfer assembly 112 along diverting rail 110. Alternatively, if intermediate low-friction member 114 is not included, the entire diverting force may be carried by leading pilot member 118 and trailing low-friction member 120. Trailing low-friction member 120 is illustrated as a low-friction surface, such as PTFE or other low-friction material. Alternatively, trailing low-friction member 120 may be a roller, preferably a roller made from a non-magnetically permeable material such as stainless steel or plastic.

Figure 11:
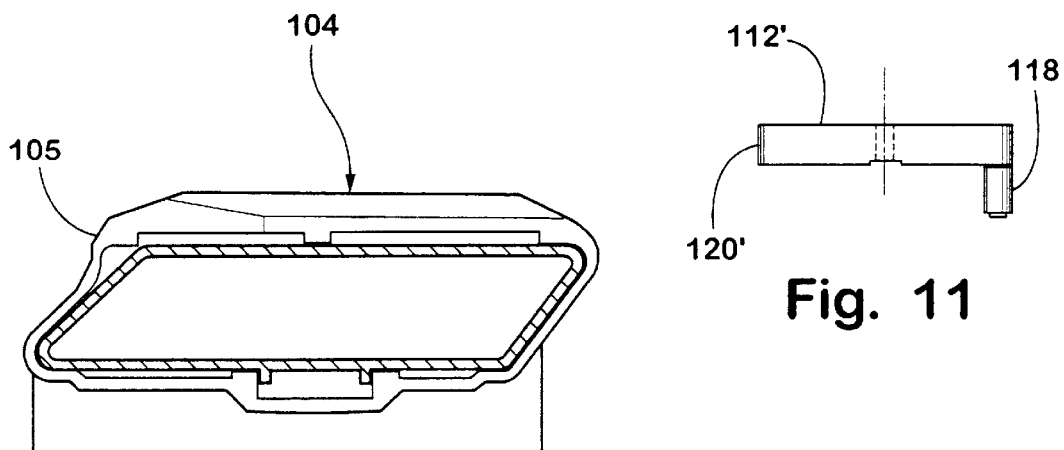
FIG. 11 is a side elevation of an alternative embodiment of a lateral propelling assembly according to the invention.
Figure 12:
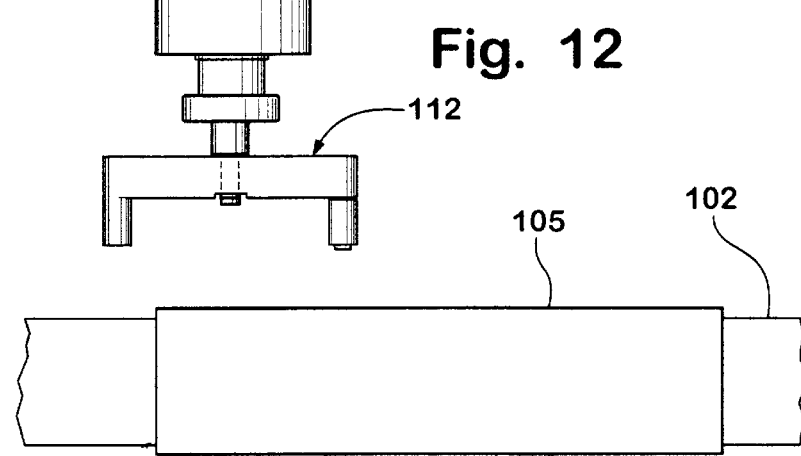
FIG. 12 is a side elevation illustrating a pusher shoe of the sorter in FIG. 8.
Figure 13:
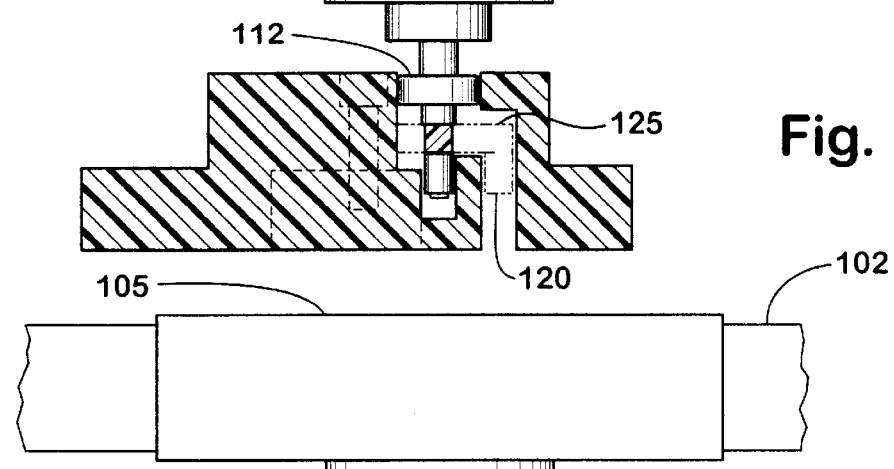
Figure 14:
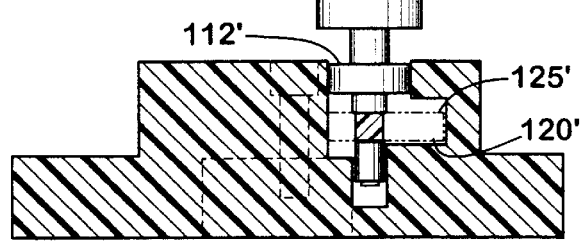
FIG. 14 is the same view as FIG. 13 with use of the lateral propelling assembly of FIG. 11.

In a modification to sorter 100, a transfer assembly 112' may include a trailing low-friction member 120' which does not protrude downwardly and parallel with leading pilot member 118 (FIGS. 11 and 14). In such an embodiment, trailing low-friction member 120' slides along curved surface 125' during the divert motion. As with the prior embodiment, sorter assembly 100 diverts a pusher shoe 104 by an attraction between the diverter actuator and a leading pilot member. Once the diverting action is initiated magnetically, it is carried out mechanically by leading pilot member 118, and trailing low-friction member 120.

In yet a further embodiment of a sortation system according to the invention, a sorter 150 includes a diverter assembly 152 including diverter actuator 154 and a diverting rail 152 (FIGS. 15–18). A transfer assembly 156 includes a leading pilot member 158 supported by a toggle 160. Toggle 160 is connected with the diverting portion of the pusher shoe (not shown) by a rotary coupling 162. Rotary coupling 162 includes a biasing spring 164 in order to bias toggle 160 in the direction of travel of the conveying surface. As in the prior embodiment, leading pilot member 158 is made from a magnetically permeable material and actuator 154 is an electromagnet. In operation, in order to divert a particular pusher shoe, diverter actuator 154 is energized in order to magnetically attract leading pilot member 150 to diverter actuator 154. This causes the leading pilot member 158 to divert to the left as viewed from above in the direction of travel in order to initiate the divert. This also compresses spring 164. As leading pilot member 158 engages diverting rail 155, the diverting of the shoe is performed mechanically as the remaining portion of transfer assembly 156 follows leading pilot member 158. If leading pilot member 158 is not actuated by diverter actuator 154, the transfer assembly 156 travels in the direction of travel of the conveying surface as a result of the centering bias imparted by spring 164.

In yet a further embodiment of the invention, a transfer assembly 156' includes a leading pilot member 158', a trailing low-friction member 166 and a rotary coupling 162'. Rotary coupling 162' is biased to the orientation illustrated in FIG. 18 by an upper camming member 168 and a lower camming member 170. When leading pilot member 158 is not being attracted to diverter actuator 154, the centering action of upper and lower camming members 168, 170 provide a centering mechanism for maintaining transfer assembly 156' aligned with the direction of movement of the conveying surface. When leading pilot member 158 is attracted to diverter actuator 154 by actuation of the diverter actuator, camming surfaces 168, 170 rotate with respect to each other. When leading pilot member 158 engages diverter rail 155, a rotation limiter (not shown) in rotary coupling 162' prevents trailing low-friction member 166 from continuing forward motion in the direction of travel of the conveying surface thereby mechanically diverting the trailing low-friction member to diverting rail 155. Other embodiments will suggest themselves to the skilled artisan.

Thus, it is seen that the present invention provides a unique and advantageous sorter which adapts the use of electromagnetic diverting technology to the requirements of close spacing of the diverter assemblies in a system which at least initially diverts at least certain of the articles out of the stream of articles without imparting a rotation motion on the diverted articles. This allows a closer spacing of articles thereby improving the throughput of the system. Furthermore, the present invention provides a diverting technique which is both fast and quiet thereby avoiding an increase in the noise level produced by the sorter. Other advantages will suggest themselves to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A positive displacement parallel sorter capable of diverting at least some articles out of a stream of articles without substantial rotation of the diverted articles comprising:

a conveying surface travelling in a travel direction;
a plurality of pusher shoes capable of traveling laterally of said conveying surface travel direction, said pusher shoes having article-contacting members extending at least partially above said conveying surface to divert articles on said conveying surface corresponding portions of said pusher shoes being generally separated from each other in said travel direction by a shoe pitch;

a plurality of diverting rails extending diagonally under said conveying surface; and a plurality of electromagnetic actuators associated with said diverting rails corresponding portions of at least two of said actuators being substantially separated from each other by no more than said shoe pitch;

wherein at least some of said pusher shoes each includes a transfer assembly below said conveying surface, wherein said transfer assembly includes a pilot member made of a magnetically permeable material; and wherein one of said at least some pusher shoes is selectively diverted to one of said diverting rails by the one of said actuators associated with that one of said diverting rails magnetically attracting the pilot member associated with the one of said at least some pusher shoes to magnetically initiate a divert and the transfer member associated with the one of said at least some pusher shoes mechanically completing the divert that is initiated magnetically.

2. The sorter of claim 1 wherein said pilot member comprises a roller.

3. The sorter in claim 2 wherein said transfer assembly is adapted to interface with one of said diverting rails to laterally propel a diverted pusher shoe.

4. The sorter in claim 3 wherein said transfer assembly includes a trailing low-friction member.

5. The sorter in claim 4 wherein said trailing low-friction member comprises a roller.

6. The sorter in claim 5 including an intermediate low-friction member between said pilot member and said trailing low-friction member.

7. The sorter in claim 1 including means for ensuring that an initiated divert will be completed.

8. A positive displacement parallel sorter capable of diverting at least some articles out of a stream of articles without substantial rotation of the diverted articles, comprising:

a conveying surface;

a plurality of pusher shoes capable of traveling laterally of said conveying surface, said pusher shoes having article-contacting members extending at least partially above said conveying surface to divert articles on said conveying surface;

a plurality of diverting rails extending diagonally under said conveying surface; and a plurality of electromagnetic actuators associated with said diverting rail;

wherein at least one of said pusher shoes includes a transfer assembly below said conveying surface, wherein said transfer assembly includes a pilot member made of a magnetically permeable material, an intermediate low-friction member and a trailing low-friction member, said pilot member, said intermediate member and said trailing member being commonly mounted on a toggle member that is pivotally mounted with respect to the article-contacting member of that pusher shoe wherein a divert is initiated by one of said actuators attracting said pilot member.

9. The sorter in claim 8 wherein said toggle member is mounted to pivot about an axis extending substantially through said intermediate low-friction member.

10. The sorter in claim 9 wherein said intermediate low-friction member is closer to said trailing low-friction member than to said leading low-friction member.

11. The sorter in claim 8 including means for ensuring that an initiated divert will be completed.

12. The sorter in claim 8 wherein each of said diverters further includes a stationary curved surface for guiding said trailing low-friction member toward the associated one of said diverting rails as said lateral propelling assembly mechanically completes a divert that is initiated mechanically.

13. The sorter in claim 8 wherein said plurality of diverters and diverting rails are configured to at least initially displace articles on said conveying surface without substantial rotation of the articles.

14. The sorter in claim 8 wherein said pilot member, said trailing low-friction member and said intermediate low-friction member are adapted to interface with one of said diverting rails to laterally propel a diverted pusher shoe.

15. A sorter, comprising:

a conveying surface;

a plurality of pusher shoes capable of traveling laterally of said conveying surface, wherein said pusher shoes include article-contacting members extending at least partially above said conveying surface to divert articles on said conveying surface, a plurality of diverting rails extending diagonally under said conveying surface; and a plurality of diverters associated with said diverting rails;

wherein at least one of said pusher shoes includes a transfer assembly below said conveying surface;

wherein at least one of said diverters includes an actuator for selectively diverting said transfer assembly toward the associated one of said diverting rails to initiate a divert and a stationary curved surface for guiding said transfer assembly toward the associated one of said diverting rails wherein at least a portion of said transfer assembly being between said actuator and said curved surface when being diverted.

16. The sorter in claim 15 wherein said transfer assembly comprises leading and trailing low-friction members, wherein said curved surface intercepts and guides said trailing member during a divert.

17. The sorter in claim 16 wherein said leading low-friction member comprises a roller.

18. The sorter in claim 16 wherein said trailing low-friction member comprises a roller.

19. The sorter in claim 16 wherein said trailing low-friction member comprises a sliding surface.

20. The sorter in claim 16 wherein said actuator comprises an electro-magnet and said leading low-friction member is magnetically permeable.

21. The sorter in claim 15 wherein said curved surface includes a surface portion whose tangent is aligned with the associated one of said diverting rails.

22. The sorter in claim 15 including means for ensuring that an initiated divert will be completed.

23. The sorter in claim 15 including a guide rail adjacent said curved surface to keep said transfer assembly from said curved surface when not being diverted.

24. The sorter in claim 22 including a magnet at one of said guide rail and said transfer assembly and a magnetically permeable material at the other of said guide rail and said transfer assembly to maintain contact between said transfer assembly and said guide rail when said actuator is not actuating said transfer assembly.

25. The sorter in claim 22 wherein said meals for ensuring includes a single elongated member.

26. The sorter in claim 25 wherein said elongated member is boat-shaped.

27. The sorter in claim 16 including an intermediate low-friction member between said leading and trailing low-friction members.

28. The sorter in claim 27 wherein said leading, trailing and intermediate low-friction members are adapted to interface with one of said diverting rails to laterally propel a diverted pusher shoe.

29. The sorter in claim 27 wherein said transfer assembly comprises said low intermediate, leading, and trailing low-friction members being commonly mounted on a toggle member that is pivotally mounted with respect to said diverting portion of said pusher shoe.

30. The sorter in claim 29 wherein said toggle member is mounted to pivot about an axis extending substantially through said intermediate low-friction member.

31. The sorter in claim 30 wherein said intermediate low-friction member is closer to said trailing low-friction member than to said leading low-friction member.

32. The sorter in claim 29 wherein said actuator comprises an electro-magnet and said leading low-friction member is magnetically permeable.

33. The sorter in claim 32 wherein said intermediate and trailing low-friction members are non-magnetically permeable.

34. The sorter in claim 20 wherein said trailing low-friction member is non-magnetically permeable.

35. The sorter in claim 15 wherein said plurality of diverters and diverting rails are configured to at least initially displace articles on said conveying surface without substantial rotation of the articles.

36. A sorter, comprising:
   a conveying surface;
   a plurality of pusher shoes capable of traveling laterally of said conveying surface, wherein said pusher shoes include article-contacting surfaces extending at least partially above said conveying surface to divert articles on said conveying surface;
   a plurality of diverting rails extending diagonally under said conveying surface; and
   a plurality of diverters associated with said diverting rails;
   wherein at least one of said pusher shoes comprising a transfer assembly below said conveying surface;
   wherein at least one of said diverters includes an actuator for selectively diverting said transfer assembly toward the associated one of said diverting rails to initiate a divert, said at least one of said diverters including a guide rail wherein at least a portion of said lateral propelling assembly passes between said actuator and said guide rail when not being diverted; and
   a magnet at one of said guide rail and said transfer assembly and a material that is magnetically responsive to said magnet at the other of said guide rail and said transfer assembly to maintain contact between said transfer assembly and said guide rail when said transfer assembly is not being diverted.

37. The sorter in claim 36 wherein said transfer assembly comprises a toggle and at least one low-friction member supported at said toggle.

38. The sorter in claim 37 wherein said actuator attracts said at least one low-friction member in order to divert the associated pusher shoe to a diverter rail.

39. The sorter in claim 38 wherein said at least one low-friction member comprises at least one roller.

40. The sorter in claim 37 wherein said at least one low-friction member includes leading and trailing low-friction members.

41. The sorter in claim 40 wherein said at least one of said diverters comprises a stationary curved surface for guiding said trailing low-friction member toward the associated one of said diverting rails.

42. The sorter in claim 41 wherein said leading low-friction member comprises a roller.

43. The sorter in claim 42 wherein said trailing low-friction member comprises a roller.

44. The sorter in claim 41 wherein said trailing low-friction member comprises a sliding surface.

45. The sorter in claim 41 wherein said actuator comprises an electro-magnet and said leading low-friction member is magnetically permeable.

46. The sorter in claim 41 wherein said curved surface includes a surface portion whose tangent is aligned with associated one of said diverting rails.

47. The sorter in claim 41 wherein said vane is configured to ensure said trailing low-friction member reaches the associated one of said diverting rails to which said leading low-friction member is actuated.

48. The sorter in claim 36 wherein said vane is a single elongated member.

49. The sorter in claim 48 wherein said vane is boat-shaped.

50. The sorter in claim 40 including an intermediate low-friction member between said leading and trailing low-friction members.

51. The sorter in claim 50 wherein said leading, intermediate, and trailing low-friction members are commonly mounted on a toggle member that is pivotally mounted with respect to the article-contacting surface of said at least one of said pusher shoes.

52. The sorter in claim 51 wherein said toggle member is mounted to pivot about an axis extending substantially through said intermediate low-friction member.

53. The sorter in claim 40 wherein said actuator comprises an electro-magnet and said leading low-friction member is magnetically permeable.

54. The sorter in claim 40 wherein said actuator comprises an electro-magnet and said trailing low-friction member is non-magnetically permeable.

55. The sorter in claim 50 wherein said leading, trailing and intermediate low-friction members are adapted to interface with one of said diverting rails to laterally propel a diverted pusher shoe.

56. The sorter in claim 36 wherein said plurality of diverters and diverting rails are configured to at least initially displace articles on said conveying surface without substantial rotation of the articles.

57. A sorter, comprising:
   a conveying surface;
   a plurality of pusher shoes capable of traveling laterally of said conveying surface, wherein said pusher shoes include article-contacting members extending at least partially above said conveying surface to divert articles on said conveying surface;

a plurality of diverting rails extending diagonally under said conveying surface; and a plurality of diverters associated with said diverting rails;

wherein at least one of said pusher shoes comprising a transfer assembly below said conveying surface;

wherein at least one of said diverters includes an actuator for selectively actuating said transfer assembly toward the associated one of said diverting rails; and means for ensuring that an initiated divert of said transfer assembly will be completed.

58. The sorter in claim 57 including a stationary curved surface for guiding said transfer assembly toward the one of said diverting rails to which it is actuated.

59. The sorter in claim 58 including a guide rail adjacent said curved surface and engaged by said transfer assembly to space said leading transfer assembly from said curved surface when not being diverted.

60. The sorter in claim 59 including a magnet at one of said guide rail and said transfer assembly and material that is magnetically responsive to said magnet at the other of said guide rail and said transfer assembly to maintain contact between said transfer assembly and said guide rail when not being diverted.

61. The sorter in claim 57 wherein said means for ensuring includes a single elongated member.

62. The sorter in claim 57 wherein said elongated member is boat-shaped.

63. The sorter in claim 57 wherein said transfer assembly includes leading, intermediate, and trailing low-friction members that are commonly mounted on a toggle member that is pivotally mounted with respect to the article-contacting surface of said at least one of said pusher shoes.

64. The sorter in claim 63 wherein said toggle member is mounted to pivot about an axis extending substantially through said intermediate low-friction member.

65. The sorter in claim 64 wherein said intermediate low-friction member is closer to said trailing low-friction member than to said leading low-friction member.

66. The sorter in claim 65 wherein said leading, trailing and intermediate low-friction members are adapted to interface with one of said diverting rails to laterally propel a diverted pusher shoe.

67. The sorter in claim 63 wherein said actuator comprises an electro-magnet and said leading low-friction member is magnetically permeable.

68. The sorter in claim 67 wherein said trailing low-friction member is non-magnetically permeable.

69. The sorter in claim 57 wherein said plurality of diverters and diverting rails are configured to at least initially displace articles on said conveying surface without substantial rotation of the articles.

70. The sorter in claim 8 wherein at least one of said intermediate and trailing low friction members being made of a non-magnetically permeable material.

71. The sorter in claim 70 wherein both said intermediate and trailing low-friction members being made of a non-magnetically permeable material.

72. A positive displacement parallel sorter, comprising:

a conveying surface;

a plurality of pusher shoes capable of traveling laterally of said conveying surface, said pusher shoes having article-contacting members extending at least partially above said conveying surface to divert articles on said conveying surface;

a plurality of diverting rails extending diagonally under said conveying surface; and a plurality of electromagnetic actuators associated with said diverting rails;

wherein at least one of said pusher shoes includes a transfer assembly below said conveying surface, wherein said transfer assembly includes a pilot member made of a magnetically permeable material mounted on a toggle member that is pivotally mounted with respect to the article-contacting member of that pusher shoe wherein a divert is initiated by one of said actuators attracting said pilot member.

\* \* \* \* \*

UNITED STATES PATENT AND TRADEMARK OFFICE
CERTIFICATE OF CORRECTION

PATENT NO. : 6,615,972 B2
DATED : September 9, 2003
INVENTOR(S) : Frank W. Veit et al.

It is certified that error appears in the above-identified patent and that said Letters Patent is hereby corrected as shown below:

Column 11,
Line 47, "rail" shoould be -- rails --.

Column 12,
Line 23, "on said conveying surface," should be -- on said conveying surface; --.

Column 13,
Line 1, "meals" should be -- means --.

Column 14,
Lines 23-24, "with associated" should be -- with the associated --.

Column 15,
Line 22, "and material" should be -- and a material --.

Signed and Sealed this

Second Day of August, 2005

JON W. DUDAS
*Director of the United States Patent and Trademark Office*